(12) United States Patent
Rocchi

(10) Patent No.: US 8,429,970 B2
(45) Date of Patent: Apr. 30, 2013

(54) MICROGYROSCOPE

(75) Inventor: Alessandro Rocchi, Rosignano Solvay (IT)

(73) Assignee: Maxim Integrated Products GmbH, Planegg (DE)

( * ) Notice: Subject to any disclaimer, the term of this patent is extended or adjusted under 35 U.S.C. 154(b) by 195 days.

(21) Appl. No.: 13/001,126

(22) PCT Filed: Jun. 25, 2009

(86) PCT No.: PCT/EP2009/058000
§ 371 (c)(1),
(2), (4) Date: Dec. 23, 2010

(87) PCT Pub. No.: WO2009/156485
PCT Pub. Date: Dec. 30, 2009

(65) Prior Publication Data
US 2011/0094301 A1    Apr. 28, 2011

(30) Foreign Application Priority Data
Jun. 27, 2008  (DE) .......................... 10 2008 002 748

(51) Int. Cl.
*G01C 19/00* (2006.01)

(52) U.S. Cl.
USPC ...................................................... 73/504.08

(58) Field of Classification Search ............... 73/504.12, 73/503.3, 504.02, 514.02, 514.32, 504.08
See application file for complete search history.

(56) References Cited

U.S. PATENT DOCUMENTS

| | | | |
|---|---|---|---|
| 6,250,157 B1 * | 6/2001 | Touge ......................... | 73/504.12 |
| 6,405,592 B1 * | 6/2002 | Murari et al. .................... | 73/493 |
| 6,520,017 B1 * | 2/2003 | Schoefthaler et al. ..... | 73/514.02 |
| 6,539,804 B1 * | 4/2003 | Iwata .......................... | 73/504.13 |
| 6,598,476 B2 * | 7/2003 | Terada et al. ............... | 73/504.16 |
| 7,100,446 B1 * | 9/2006 | Acar et al. .................. | 73/504.13 |

(Continued)

FOREIGN PATENT DOCUMENTS

| | | |
|---|---|---|
| EP | 1832841 | 9/2007 |
| WO | WO 98/17973 | 4/1998 |

(Continued)

OTHER PUBLICATIONS

German Patent Office Search Report 10 2008 002 748.0, issued Sep. 19, 2008.

(Continued)

*Primary Examiner* — Peter Macchiarolo
*Assistant Examiner* — Samir M Shah
(74) *Attorney, Agent, or Firm* — North Weber & Baugh LLP

(57) ABSTRACT

A microgryroscope for determining rotational movements about an x, y or z axis. At least one anchor is fastened to a substrate. A plurality of, in particular four, masses that oscillate radially with respect to the anchor are fastened to the anchor by springs. Drive elements are used to vibrate at least individual ones of the masses in an oscillatory manner in the x or y direction in order to produce Coriolis forces when the substrate is deflected. Sensor elements are used to detect deflections of the masses on account of the Coriolis forces produced. The oscillating masses are connected to at least one additional, non-oscillating mass which can, however, rotate together with the oscillating masses on the substrate about the at least one anchor. A further sensor element is associated with this additional mass.

13 Claims, 4 Drawing Sheets

U.S. PATENT DOCUMENTS

Figure 1:
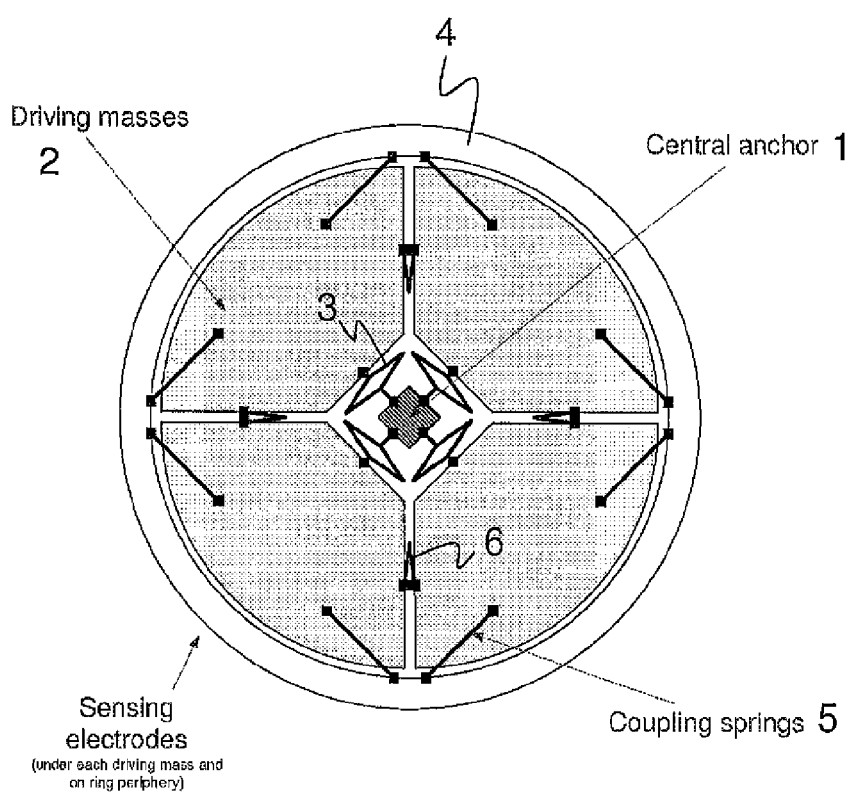

| | | | | |
|---|---|---|---|---|
| 7,437,933 B2* | 10/2008 | Durante et al. | | 73/504.15 |
| 7,444,870 B2* | 11/2008 | Uchiyama et al. | | 73/504.12 |
| 7,520,169 B2* | 4/2009 | Schwarzelbach | | 73/504.12 |
| 7,832,271 B2* | 11/2010 | Mita et al. | | 73/504.12 |
| 8,176,779 B2* | 5/2012 | Blomqvist | | 73/504.12 |
| 2002/0189352 A1* | 12/2002 | Reeds et al. | | 73/504.04 |
| 2002/0189353 A1* | 12/2002 | Knowles et al. | | 73/504.12 |
| 2006/0070441 A1* | 4/2006 | Durante et al. | | 73/504.12 |
| 2007/0180909 A1* | 8/2007 | Uchiyama et al. | | 73/504.14 |
| 2007/0194857 A1* | 8/2007 | Schwarzelbach | | 331/23 |
| 2007/0214883 A1* | 9/2007 | Durante et al. | | 73/504.04 |
| 2008/0276706 A1* | 11/2008 | Hartmann et al. | | 73/504.04 |
| 2009/0090200 A1* | 4/2009 | Mita et al. | | 74/5.7 |
| 2009/0260437 A1* | 10/2009 | Blomqvist | | 73/504.12 |
| 2010/0011857 A1* | 1/2010 | Gier et al. | | 73/504.12 |
| 2010/0263446 A1* | 10/2010 | Tamura et al. | | 73/504.12 |
| 2011/0061460 A1* | 3/2011 | Seeger et al. | | 73/504.12 |
| 2012/0048017 A1* | 3/2012 | Kempe | | 73/504.12 |

FOREIGN PATENT DOCUMENTS

| | | |
|---|---|---|
| WO | WO 00/29855 | 5/2000 |
| WO | WO 02/103364 | 12/2002 |
| WO | WO 2006/023174 | 3/2006 |

OTHER PUBLICATIONS

English Translation of the International Preliminary Report on Patentability, PCT/EP2009/058000, Issued Jan. 18, 2011.

A Monolithic Silicon Gyroscope Capable of Sensing About Three Axes Simultaneously, D Wood, G Cooper, J S Burdess, A J Harris and J L Cruickshank, 1996, The Institution of Electrical Engineers.

Design and Dynamics of an Innovative Micro Gyroscope Against Coupling Effects, Nan-Chyuan Tsai, Chung-Yang Sue, Chih-Che Lin, Jan. 8, 2008, Microsyst Technol.

* cited by examiner

Driving electrodes and motor monitoring electrodes

MICROGYROSCOPE

CROSS-REFERENCE TO RELATED APPLICATIONS

This application claims priority to International Application Serial No. PCT/EP2009/058000 filed Jun. 25, 2009, which claims priority to German Application No. DE 102008002748.0 filed Jun. 27, 2008.

TECHNICAL FIELD

The invention refers to a microgyroscope in accordance with the generic term of claim 1.

BACKGROUND

Generally, microgyroscopes are used for determining a rotating movement around an axis in an x-, y-, z-system of coordinates. Therefore, to determine the rotating movements of the system around each one of the three axes, three such microgyroscopes are needed. It is costly and time consuming to control them and evaluate the data.

So a three-dimensional microgyroscope in which rotations in all three axes can be set can be created, D. Wood et al. suggested in their 1996 article "A Monolithic Silicone Gyroscope Capable of Sensing about Three Axes Simultaneously" to create a gyroscope that would have ring-shaped oscillating masses arranged around a central anchor, capable of sensing tilting and rotating movements owing to the Coriolis forces that would occur. The disadvantage is that both the production of such a sensor and the driving of the masses that move are difficult or impossible. The designs of D. Wood et al. therefore remain merely theoretical.

In the article "Design and Dynamics of an Innovative Microgyroscope against Coupling Effects" authored by Nan-Chyuan Tsai, a 3-D gyroscope is also suggested, but its disadvantage is that there is an inner disk and an outer ring as well as four moving masses. The deflections, especially those of the inner disk, can only be determined with difficulty.

OBJECTS AND SUMMARY OF THE INVENTION

The task of this invention is therefore the creation of a 3-D microgyroscope capable of high recording accuracy with a reasonable manufacturing cost.

The task is solved with a microgyroscope that has at least one more mass mounted, at any rate indirectly, on the anchor in addition to the oscillating masses. The deflections caused by the Coriolis forces are detected by sensor elements assigned to the oscillating masses and the additional masses. Their swinging and/or rotating movements are detected with this method. The anchor can be made of different parts or a single one. If made of several parts, every one of the oscillating masses can be arranged on one of these partial anchors. The important thing is, first of all, for the oscillating masses to allow radial movements away from and toward the anchor(s) and, secondly, to allow a tilting and rotating movement around the anchor. As a result of this, the oscillating masses can act as driving masses on the one hand, and movements to the respective masses can be transferred owing to the Coriolis forces on the other hand. This allows detection of the gyroscope's rotations (i.e., especially of the substrate) around an x-, y- or z-axis together with the correspondingly assigned sensor elements.

Preferably and without restrictions, the sensor elements for determining the deflection of the oscillating masses are arranged underneath the latter—in other words, between the oscillating masses and the substrate. In this case, the sensor elements can—if they are the capacitive type, for example—detect a deflection of the oscillating masses through a change of tensions. The sensor element for detecting a rotating movement of the additional mass can be determined either through capacitive sensors connected to the additional mass or through equivalent sensors that determine a change in the distance to a stationary element of this sensor element.

It is especially advantageous if the additional mass surrounds the oscillating masses as a ring or frame. As a result of this, the external circumference of the oscillating mass is fastened and supported to the additional mass. The result is a stable system that can also withstand external shocks.

If the additional mass is fastened to the substrate with bending springs, the mass can also support itself appropriately to cushion impacts being exerted on the system from the outside and to avoid erroneous measurements.

If the bending springs allow the additional mass to rotate around the z-axis, then they are suitable for transferring the respective Coriolis forces (which cause the additional mass to rotate) very easily to a deflection of the additional mass without hindering it.

Preferably, one anchor should be centrally arranged to allow a good and uniform deflection in all four rotating axes.

If the oscillating masses are fastened to a central anchor, then once again, a uniform and symmetrical system is given for the satisfactory and uniform detection of all three rotating options.

In an especially advantageous design of the invention, a central disk is arranged between the oscillating masses and the central anchor. This central disk can carry out the tilting and rotating movements of the oscillating masses as well as those of the additional mass(es) arranged on them particularly well. If the central disk is fastened to the anchor like a universal joint, then this fastening allows the masses to swing around the x- and y-axis.

In order to design the oscillating masses so they can move radially, it is advantageous for them to be attached to the central disk with springs or, if there is no central disk, directly to the anchor and/or to the additional masses with more springs. The oscillating masses will therefore be capable of swinging back and forth along the x-y-plane. The springs should be preferably designed so they can prevent the oscillating masses from moving in z-direction, especially when the oscillating masses are fastened to the central disk, which is in turn mounted in a way to allow movement. If the springs are relatively rigid in the z-direction, a deflection of the oscillating masses in z-direction is possible only with the elastically mounted central disk and the additional masses connected firmly in this direction with the oscillating masses.

To allow a uniform swinging of the oscillating masses, synchronizing springs are advantageously provided for connecting the oscillating masses to one another. The synchronizing springs permit, on the one hand, certain elasticity in circumferential direction around the anchor so the oscillating masses can separate somewhat from each other in their linear radial movement. On the other hand, they hinder the oscillating masses, however, as far as these should tend not to swing outwardly and inwardly in an even and simultaneous manner.

If the oscillating masses and the additional mass and/or the central disk are mounted around the z-axis in a movable way, especially with the appropriate springs, then it is possible for the oscillating masses and the additional mass to indicate a rotating movement owing to a Coriolis force that affects the z-axis by the movement of these masses in the appropriate direction. The rotating movement can thereupon be detected and evaluated with sensor elements.

Electrodes—especially forked or comb-shaped electrodes—are preferentially provided for driving the oscillating masses. These electrodes stimulate the oscillating masses to swing appropriately and cause a targeted swinging with a predetermined frequency.

Figure 2:
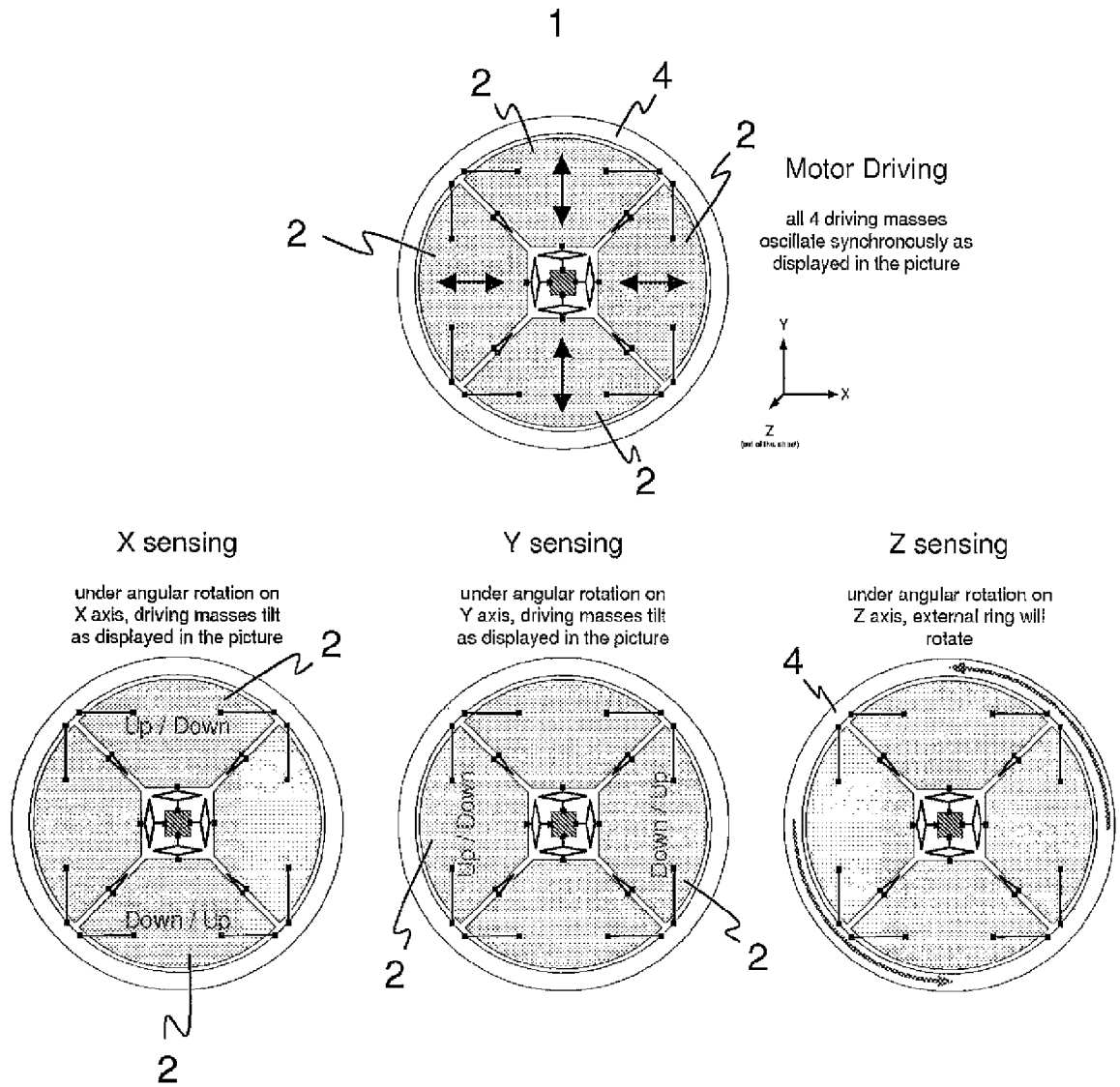
Figure 3:
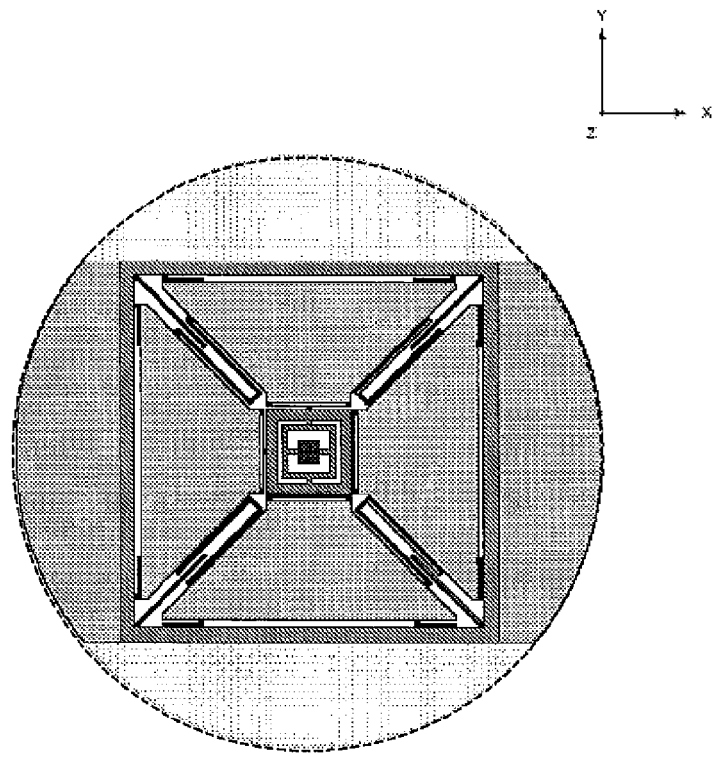
Figure 4:
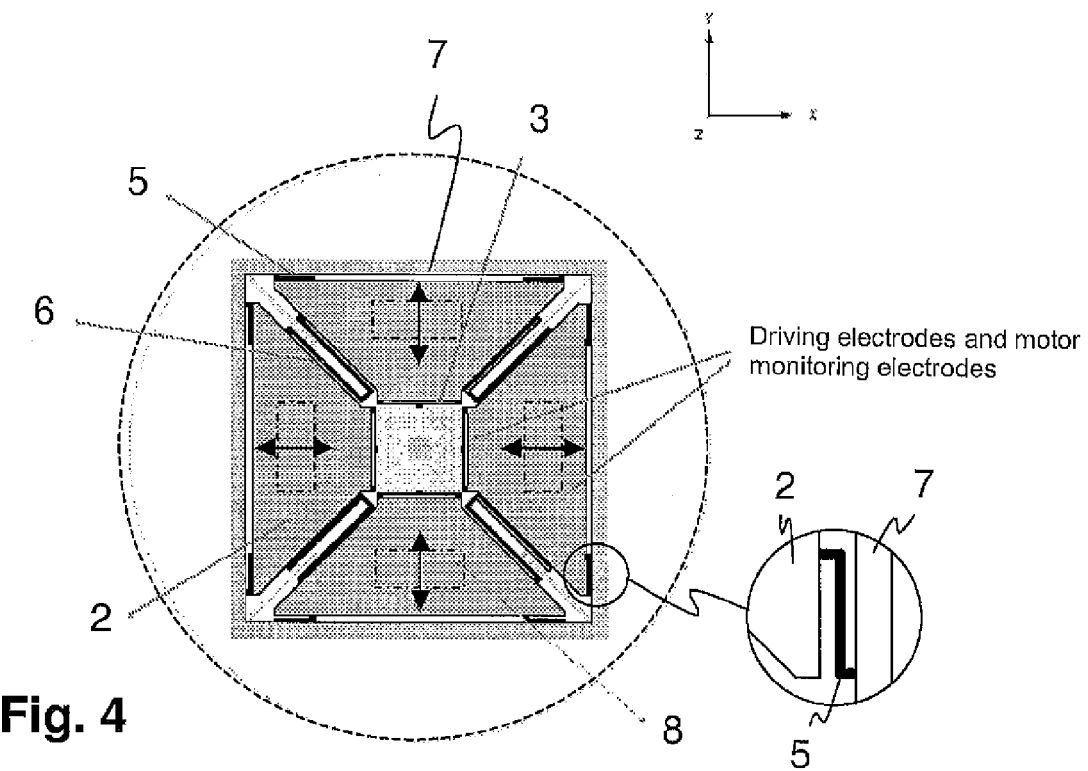
Figure 5:
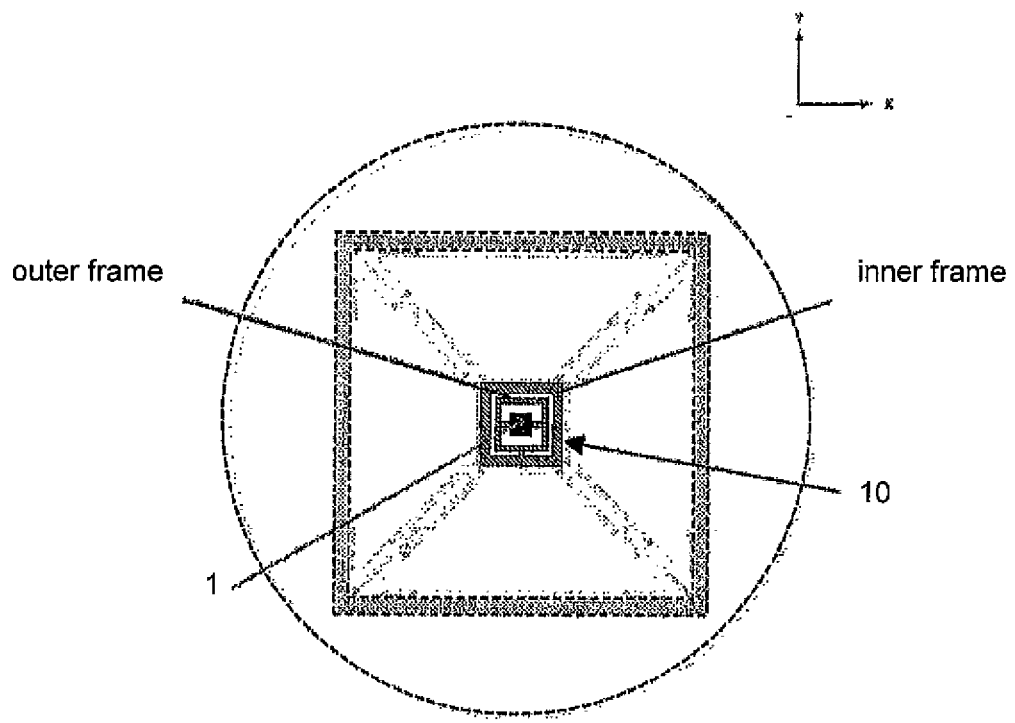

Further advantages of the invention and other invention-related ideas are presented in the description of the embodiments given below. They show:

FIG. 1 An overview of a possible design of the invention,

FIG. 2 The working principle of the gyroscope in accordance with FIG. 1,

FIG. 3 Another embodiment of the invention,

FIG. 4 The driving structure of the design in accordance with FIG. 3,

FIG. 5: The central disk of the design in accordance with FIG. 3, and

Figure 6:
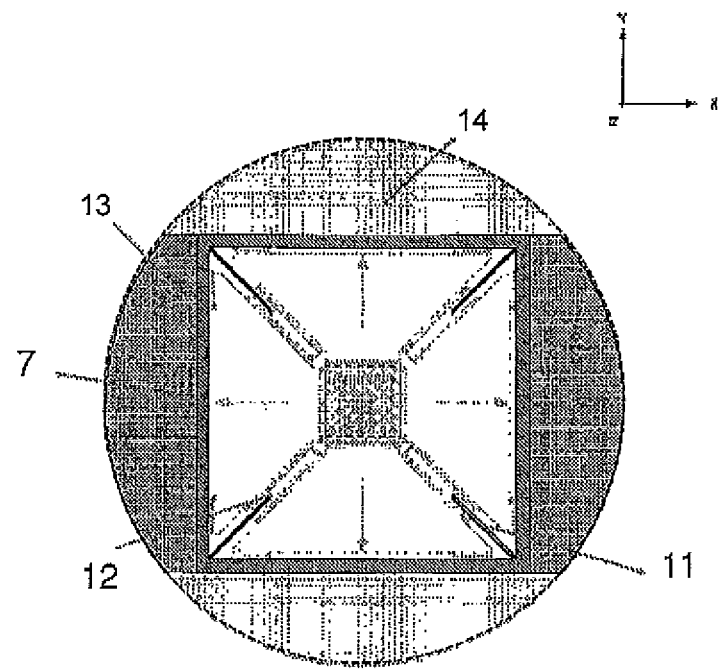

FIG. 6: The outer frame of the design in accordance with FIG. 3.

DETAILED DESCRIPTION OF THE DRAWINGS

FIG. 1 shows a possible embodiment of a microgyroscope according to the invention. Four oscillating driving masses 2 are arranged on a central anchor 1 fastened to a substrate lying on the drawing plane. The masses 2 are attached to the anchor 1 with springs 3, so that the springs can first of all rotate around the anchor 1 in the drawing plane but also swing around a rotating axis lying on the drawing plane too. The springs 3, here shown as diamond-shaped symbols, also allow the driving masses 2 to move away from and back towards the central anchor 1 in a radial direction. Thus, the driving masses oscillate radially. To accomplish this, driving elements (not shown) are provided for driving electrodes that maintain the masses 2 in an oscillating motion, for example. The driving masses 2 are surrounded by an additional mass, in this case a ring 4. This ring 4 is connected to the masses 2 with coupling springs 5. The coupling springs 5 are arranged and oriented in a way to impede as little as possible the oscillating movement of the masses 2 on the one hand, but also to cause a coupling of the ring 4 with the driving masses 2 in rotational and swinging direction, on the other hand. If the driving masses 2 and the ring 4 are deflected owing to an occurring Coriolis force, then both the oscillating masses and the additional mass in the shape of the ring 4 are coupled together and experience the same deflection. Accordingly, the coupling springs 5 are executed so they can yield in radial direction but remain stiff in the other directions. However, in another design, they can also be executed to allow the oscillating masses to tilt but not the additional mass, i.e., the ring 4. In this case, the coupling springs 5 are soft except in the rotating direction around the z-axis. Here, the oscillating masses move when there is a tilting movement around the x- or y-axis relative to the ring 4, and this ring 4 remains untitled in its x-y-plane.

Synchronizing springs 6 have been arranged between the four driving masses 2. These synchronizing springs 6 are executed to support a synchronous swinging of the driving masses 2. Consequently, they allow a certain rotation when the distance between the two driving masses 2 increases when the driving masses 2 are moved radially outwards and a decrease of the distance when the driving masses 2 are moved back toward the center. On the other hand, the synchronizing springs remain stiff in case the driving masses 2 would try to oscillate unevenly.

Sensor electrodes that can detect a change in the distance have been arranged below the driving masses 2 and in the region of the ring 4, especially along its periphery. These sensor electrodes consist, for example, of disks having a capacitive effect that detect a rotating movement of the system around the central anchor 1 or a tilting movement around one of the axes lying on the drawing plane.

FIG. 2 shows the various directions of movement of the microgyroscope shown in FIG. 1. Propulsion takes place through an oscillating movement of the four driving masses 2 in the radial direction, starting from the central anchor 1. The driving masses 2 oscillate synchronously in the drawing plane—in other words, in the x-y-axis. First of all, the springs 3, 5 and 6 stabilize the driving masses 2 and secondly, they allow a smooth oscillating movement. The ring 4 remains still in this initial situation.

If an occurring Coriolis force causes the system to rotate around the x-axis, the masses 2 shown above and below will move upwards or downwards. Even the ring 4 can be moved in this direction if the coupling springs 5 are appropriately executed—in other words, the entire system consisting of the driving masses 2 and the ring 4 swings upwards or downwards around the x-axis. In another design of the coupling springs 5, however, only the masses 2 swing upwards and downwards, while the ring 4 remains still without swinging in the drawing plane. As shown in the middle illustration, if a Coriolis force makes the system rotate around the y-axis, the mass 2 shown left and right will move together with it or, with the appropriate design of the coupling springs 5, move around the y-axis even without the ring 4, thereby swinging upwards or downwards.

Should a Coriolis force be detected that causes the system to rotate around the z-axis that protrudes from the drawing plane, then the system will move around the central anchor 1. If this occurs, both the masses 2 and the ring 4 are moved jointly around the z-axis in this direction through the stiffness of the coupling springs 5.

With the system executed according to the invention, it is possible to determine relatively easy the movements of the microgyroscope in the three x, y and z rotating axes. The respective deflections are detected by sensor electrodes arranged in the area of the deflected masses.

FIG. 3 shows an overview of another embodiment of a sensor according to the invention. The proposed sensor manufactured with known micro-machining technology is a 3-D miniature gyroscope capable of detecting rotating accelerations around the three axes x, y and z. An essential feature of the invention is the four synchronously-driven masses 2 (FIG. 4) that change their movement under the influence of external rotating speeds. This change of movement is detected by electrodes with capacitive changes. The synchronous masses 2 allow one single driving control loop in the associated electronics and the result is a simple and economical system. To reduce the costs of the sensor system (in other words, of the microgyroscope) together with the evaluation electronics, the sensor's design according to the invention can carry out a time sharing when the sensor electrodes are queried. The angular speeds around the z-, y- and z-axes can be read by the same and only channel, as the individual angular speeds are successively queried in different time domains. As a result of this, the entire evaluation electronics can be manufactured much more economically without sacrificing the accuracy of the system. The following figures describe the details of the sensor more thoroughly.

FIG. 4 shows the sensor's driving structure. Driving elements such as electrodes (not shown) drive the four oscillating driving masses 2 in high frequency in the radial direction.

Every driving mass is attached with springs 3, 5 and 6. In this embodiment, spring 3 is fastened to a central disk (described below) on a contact point, and this contact point is centrally arranged between two additional attachment points of the spring 3 that are fastened to the mass 2. As a result of this, we have a system that has a certain elasticity in the radial direction. Additionally, the system is elastic with respect to rotating movements around the z-axis. Furthermore, the mass 2 is fastened to an outer frame 7 via two coupling springs 5 designed in the form of a "z". The design of these two springs causes an elastic mounting of the mass 2 in the radial direction to allow the mass 2 to move in an oscillating manner. On the other hand, the coupling springs 5 can have an alternate design that causes a rigid or smooth coupling of the mass 2 with the frame 7 with respect to the tilting movements around the x- or y-axis. With respect to the rotating movements around the z-axis, the masses 2 and the frame 7 are mostly rigidly connected to each other via the coupling springs 5. If forces that move the system around the x-, y- or z-axis occur, then the system can be coupled to the mass 2 and the frame 7 so both can be equally deflected. However, the stiff coupling can also be designed so it only involves one rotating movement around the z-axis. If there is a movement around the x- or y-axis in this alternate design, only the moved masses 2 tilt, but not the frame 7.

So neighboring masses 2 can be allowed to swing in an oscillating manner, they are connected with synchronizing springs 6. These are located in the gap between two neighboring masses 2 and allow the gap between the two neighboring masses 2 to increase and decrease, depending on whether the masses are close to the sensor's center or farther away from it. On the other hand, the synchronizing springs 6 are stable and stiff if the neighboring masses would attempt to swing asynchronously. Consequently, it is not allowed for one of the masses 2 to be closer to the sensor than the neighboring mass 2.

The four driving masses 2 swing, as indicated by the double arrows. Needless to say, the design of the masses 2 can differ from the one shown here. Thus, the masses can have a different shape and the driving electrodes, in particular, can be integrated in them, for example. The driving masses 2 can be electrostatically activated with driving electrodes shaped like forks, combs, parallel electrodes or something else. Driving monitoring electrodes, which can also be arranged near the masses 2, monitor the driving movement. They can be executed as combs or once again as parallel electrodes or have another shape. These electrodes allow one to check that the driving of the masses 2 is done properly and with a predetermined frequency.

Plate electrodes 8 are preferentially arranged under every one of the driving masses 2 so a deflection around the x- or y-axis can be detected.

FIG. 5 shows a central disk 10 in more detail. The central disk 10 has a structure resembling a universal joint and consists of two frames arranged concentrically to one another, in which case the inner frame located on the central disk 10 is linked to a spring oriented in the x-direction. The outer frame is connected to the inner frame via a spring oriented in the y-direction and as a result of this, with the corresponding design of the springs it is possible for the outer frame to swing together with the inner frame more easily around the x-axis. This causes the masses 2 and the frame 7—which are, in turn, fastened to the central disk 10, especially on the outer ring of the central disk 10—to be able to swing accordingly around the x-axis or y-axis. Coriolis forces, which can cause such a deflection, could now be detected. Naturally, the masses 2 can be attached to the central anchor 1 in some other way. A direct fastening to the central anchor 1 is possible with the appropriately designed springs, for example.

The central disk 10 is used to fasten the springs 3 of the driving masses 2. If the fastening springs—with which the outer frame is fastened to the inner frame and this one in turn is fastened to the central anchor 1—are appropriately designed, the central disk 10 can swing around the x-axis and y-axis. In addition, the central disk 10 has the advantage of being potentially very stable, especially with regard to impacts against the system coming from the outside. Thus, it ensures a stable mounting of the masses 2 and the frame 7 without making them deflection-prone with slight blows so they hit the substrate and provide wrong results. The central disk 10 is fastened to the sensor substrate via the central anchor 1.

FIG. 6 shows the outer frame 7 of the sensor in more detail. The outer frame 7 is fastened to the moving masses through the coupling springs 5. The frame 7 can also have another design such as a ring, for example (as in FIGS. 1 and 2) or also as a ring or frame segment for connecting the individual neighboring masses 2 to one another. The frame 7 is attached to the substrate with frame springs 11, and these frame springs 11 are executed to allow the frame 7 to rotate around the z-axis. The frame springs 11 are therefore made flexibly for such a rotating movement.

On their end that looks away from the frame, the frame springs 11 are fastened to the substrate with spring anchors 12. Rotations of the frame 7 can be detected with frame sensor electrodes 13 arranged along the frame periphery 14. These electrodes can be finger-shaped and radially arranged or they can also be executed as radially arranged comb pairs.

This invention is not restricted to the embodiments shown; many other designs are possible within the framework of the wording of the patent claims and the description. Even design combinations of individual embodiment components among themselves are also possible.

The invention claimed is:

1. A microgyroscope for determining rotational movements around an x-axis, a y-axis or a z-axis, comprising:
    a substrate on which at least one anchor is fastened,
    a plurality of individual oscillating masses, each of said plurality of individual oscillating masses being configured to radially oscillate with respect to said at least one anchor, wherein each of said plurality of individual oscillating masses is fastened to the at least one anchor with at least one spring,
    driving elements for oscillating said plurality of individual oscillating masses along the x-axis or the y-axis, in order to generate Coriolis forces when the substrate is deflected, and
    sensor elements for detecting deflections of said plurality of individual oscillating masses with respect to the substrate, said deflections being caused due to said generated Coriolis forces associated with the rotational movements around the x-axis or the y-axis,
    wherein said plurality of individual oscillating masses are connected to at least one additional mass, which is not oscillating but is rotatable together with said plurality of individual oscillating masses on the substrate, around the at least one anchor, for the purpose of sensing the rotational movement around the z-axis, and
    an additional sensor element is disposed to detect movement of said at least one additional mass.

2. A microgyroscope according to claim 1 wherein said sensor elements are arranged underneath said plurality of individual oscillating masses for detecting said deflections of the plurality of individual oscillating masses.

3. A microgyroscope according to claim 1, wherein the at least one additional mass surrounds the plurality of individual oscillating masses as a ring.

4. A microgyroscope according to claim 1, wherein the at least one additional mass is attached to the substrate with bending springs.

5. A microgyroscope according to claim 4, wherein the bending springs allow the at least one additional mass to rotate around the z-axis.

6. A microgyroscope according to claim 1, wherein the at least one anchor is centrally arranged.

7. A microgyroscope according to claim 1, wherein the plurality of individual oscillating masses are fastened to a central anchor.

8. A microgyroscope according to claim 7, wherein a central disk is arranged between the plurality of individual oscillating masses and the central anchor.

9. A microgyroscope according to claim 8, wherein the central disk is fastened to the central anchor as a universal joint to allow the plurality of individual oscillating masses to swing around the x-axis and the y-axis.

10. A microgyroscope according to claim 8, wherein the plurality of individual oscillating masses are fastened with springs to the central disk and/or the at least one additional mass.

11. A microgyroscope according to claim 8, wherein the plurality of individual oscillating masses and the at least one additional mass, and/or the central disk are pivoted around the z-axis.

12. A microgyroscope according to claim 1, wherein the plurality of individual oscillating masses are mutually connected to one another with synchronizing springs.

13. A microgyroscope according to claim 1, wherein the driving elements of the plurality of individual oscillating masses are fork-shaped electrodes.

* * * * *